United States Patent
Bradley et al.

(10) Patent No.: US 11,749,046 B2
(45) Date of Patent: *Sep. 5, 2023

(54) SYSTEM AND METHOD FOR AN INAUDIBLE TONES TRACKING SYSTEM

(71) Applicant: Adio, LLC, Matawan, NJ (US)

(72) Inventors: Nathaniel T. Bradley, Tucson, AZ (US); William Talmage, Calverton, NY (US); Joshua S. Paugh, Tucson, AZ (US); Robert Dromerhauser, Bay Shore, NY (US)

(73) Assignee: ADIO, LLC, Matawan, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,494

(22) Filed: Nov. 9, 2021

(65) Prior Publication Data

US 2022/0068069 A1 Mar. 3, 2022

Related U.S. Application Data

(63) Continuation of application No. 16/681,459, filed on Nov. 12, 2019, now Pat. No. 11,195,362, which is a continuation of application No. 16/281,722, filed on Feb. 21, 2019, now Pat. No. 10,497,196, which is a continuation of application No. 15/819,729, filed on Nov. 21, 2017, now Pat. No. 10,242,518.

(60) Provisional application No. 62/424,921, filed on Nov. 21, 2016.

(51) Int. Cl.
*G07C 9/30* (2020.01)
*H04B 11/00* (2006.01)
*G07C 9/38* (2020.01)

(52) U.S. Cl.
CPC ............. *G07C 9/30* (2020.01); *G07C 9/38* (2020.01); *H04B 11/00* (2013.01)

(58) Field of Classification Search
CPC .... G07C 9/00126; H04B 11/00; G01C 21/16; G01S 5/0221
See application file for complete search history.

(56) References Cited

U.S. PATENT DOCUMENTS

| | | | |
|---|---|---|---|
| 5,218,344 A | 6/1993 | Ricketts | |
| 6,693,544 B1 | 2/2004 | Hebbecker | |
| 7,592,911 B1 * | 9/2009 | Hudgens | G08B 21/22 340/3.1 |
| 10,242,518 B2 * | 3/2019 | Bradley | G07C 9/38 |
| 10,909,566 B2 | 2/2021 | Webster | |
| 10,917,693 B2 | 2/2021 | Webster | |
| 11,483,620 B2 | 10/2022 | Webster | |
| 2002/0026866 A1 * | 3/2002 | Nishitani | G10H 1/0008 84/600 |
| 2002/0111702 A1 | 8/2002 | Angel | |
| 2005/0129139 A1 | 6/2005 | Jones et al. | |
| 2005/0129254 A1 | 6/2005 | Connor et al. | |

(Continued)

*Primary Examiner* — Thomas D Alunkal
(74) *Attorney, Agent, or Firm* — Goodhue, Coleman & Owens, P.C.

(57) ABSTRACT

A tracking system, wireless device, and method. The tracking system includes sensors receiving one or more inaudible tones from an electronic device detected by at least one of the sensors. The tracking system includes a server in communication with the sensors identifies a location of the electronic device in response to detecting the one or more inaudible tones associated with the electronic device.

20 Claims, 5 Drawing Sheets

(56) References Cited

U.S. PATENT DOCUMENTS

| | | | |
|---|---|---|---|
| 2005/0280526 A1* | 12/2005 | Kalafarski | G08B 3/10 340/384.73 |
| 2006/0251442 A1 | 11/2006 | Fuqua et al. | |
| 2006/0258376 A1 | 11/2006 | Ewell | |
| 2007/0132637 A1 | 6/2007 | Kolavennu et al. | |
| 2009/0207694 A1* | 8/2009 | Guigne | G01S 5/22 367/127 |
| 2012/0197764 A1* | 8/2012 | Nuzzi | G06Q 30/0641 705/27.1 |
| 2013/0048709 A1* | 2/2013 | Turner | G06Q 20/3272 235/375 |
| 2014/0164122 A1* | 6/2014 | Wissner-Gross | G06Q 30/0261 705/14.58 |
| 2014/0365334 A1 | 12/2014 | Hurewitz | |
| 2015/0130591 A1 | 5/2015 | Boyd | |
| 2016/0028446 A1* | 1/2016 | Moon | H04B 5/02 455/41.1 |
| 2016/0055360 A1 | 2/2016 | Haugarth | |
| 2016/0104190 A1 | 4/2016 | Webster | |
| 2016/0165333 A1* | 6/2016 | Gokingco | A61B 5/0002 381/74 |
| 2017/0249584 A1 | 8/2017 | Lavery et al. | |
| 2017/0270326 A1 | 9/2017 | Anderson et al. | |
| 2019/0013879 A1 | 1/2019 | Webster | |
| 2019/0281354 A1 | 9/2019 | Webster | |
| 2021/0160570 A1 | 5/2021 | Webster | |
| 2021/0377335 A1 | 12/2021 | McWilliams | |
| 2021/0398031 A1 | 12/2021 | Webster | |
| 2021/0406855 A1 | 12/2021 | Webster | |

* cited by examiner

SYSTEM AND METHOD FOR AN INAUDIBLE TONES TRACKING SYSTEM

PRIORITY STATEMENT

This application is a continuation of and claims priority to U.S. application Ser. No. 16/681,459 filed on Nov. 12, 2019, titled System and Method for Inaudible Tones Tracking which is a continuation of and claims priority to U.S. application Ser. No. 16/281,722 filed on Feb. 21, 2019, titled Inaudible Tones Tracking Chip and System for Security and Safety which is a continuation of U.S. non-Provisional application Ser. No. 15/819,729 filed on Nov. 21, 2017, titled Inaudible Tones Used for Security and Safety which claims priority to U.S. Provisional Patent Application No. 62/424,921 filed on Nov. 21, 2016 and all of which are hereby incorporated by reference in their entirety.

BACKGROUND

I. Field of the Disclosure

The illustrative embodiments relate to a security system. More specifically, but not exclusively, the illustrative embodiments relate to utilizing inaudible tones in a security system for protecting individuals and assets.

II. Description of the Art

The utilization of security systems has grown exponentially in recent years. The growth is fostered by component miniaturization, enhanced wireless signals, protocols, and standards, and other product advancements. Despite these advancements, many systems and devices are still unreliable, easily detected, or high power. Enhanced security systems are still needed to meet user's varying needs.

SUMMARY OF THE DISCLOSURE

The illustrative embodiments provide a tracking system, wireless device, and method. The tracking system includes sensors receiving one or more inaudible tones from an electronic device detected by at least one of the sensors. The tracking system includes a server in communication with the sensors identifies a location of the electronic device in response to detecting the one or more inaudible tones associated with the electronic device.

Another embodiment provides a tracking system. The sensors are configured to receive one or more inaudible tones from electronic devices including an electronic device. The tracking system includes a server in communication with the sensors identifies a location of an electronic device in response to detecting the one or more inaudible tones associated with the electronic device. In another embodiment, the tracking system includes electronic devices each of the electronic devices transmit one or more inaudible tones.

The illustrative embodiments provide a wireless device, system, and method for utilizing inaudible tones. One or more inaudible tones are associated with information. One or more inaudible tones are transmitted from an electronic device. The one or more inaudible tones are audio signals that are inaudible to humans. The one or more inaudible tones include the information identifying a user or an item associated with the electronic device. Another embodiment provides a system including a processor for executing a set of instructions and memory for storing the set of instructions. The set of instructions may be executed to perform the method herein described.

Another embodiment provides a wireless device. The wireless device includes a processor for executing a set of instructions and memory executing the set of instructions and information. The set of instructions are executed by the processor to associate one or more inaudible tones with the information identifying a user or an item. The wireless device also includes a transmitter for sending the one or more inaudible tones as audio signals that are inaudible to humans, and wherein the one or more inaudible tones includes the information identifying a user or an item associated.

Another embodiment provides a system for utilizing inaudible tones. The system includes a processor for executing a set of instructions and a memory for executing the set of instructions. The set of instructions are executed to associate one or more inaudible tones with information, and transmit one or more inaudible tones from an electronic device. The one or more inaudible tones are audio signals that are inaudible to humans. The one or more inaudible tones includes the information identifying a user or an item associated with the system.

The illustrative embodiments provide a tracking chip, system, and method including a battery powering components of the tracking chip. The tracking chip further includes a transmitter broadcasting one or more inaudible tones. The one or more inaudible tones are an audio tone that is inaudible to humans. The tracking chip further includes a logic engine that manages transmission of the one or more inaudible tones.

Another embodiment provides a method for utilizing inaudible tones. A tag is associated with information. One or more inaudible tones are transmitted from a transmitter integrated in a tag. The inaudible tone is an audio signal that is inaudible to humans. The one or more inaudible tones include at least the information. Another embodiment provides a system including a processor for executing a set of instructions and a memory for storing the set of instructions. The set of instructions may be executed to perform the method herein described.

Another embodiment provides a security system and method including a transmitter broadcasting an inaudible signal. The security system further includes one or more sensors configured to detect the inaudible signal. The security system further includes a processing system in communication with the one or more sensors. The processing system tracks the inaudible signal from the transmitter throughout a location. Another embodiment provides a system including a processor for executing a set of instructions and a memory for storing the set of instructions. The set of instructions may be executed to perform the method herein described.

Yet another embodiment provides a method for utilizing inaudible signals. An inaudible signal is broadcast from a transmitter. Information associated with the inaudible signals is determined. The transmitter is associated with the location where the inaudible signal was received. The information is saved for subsequent access.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
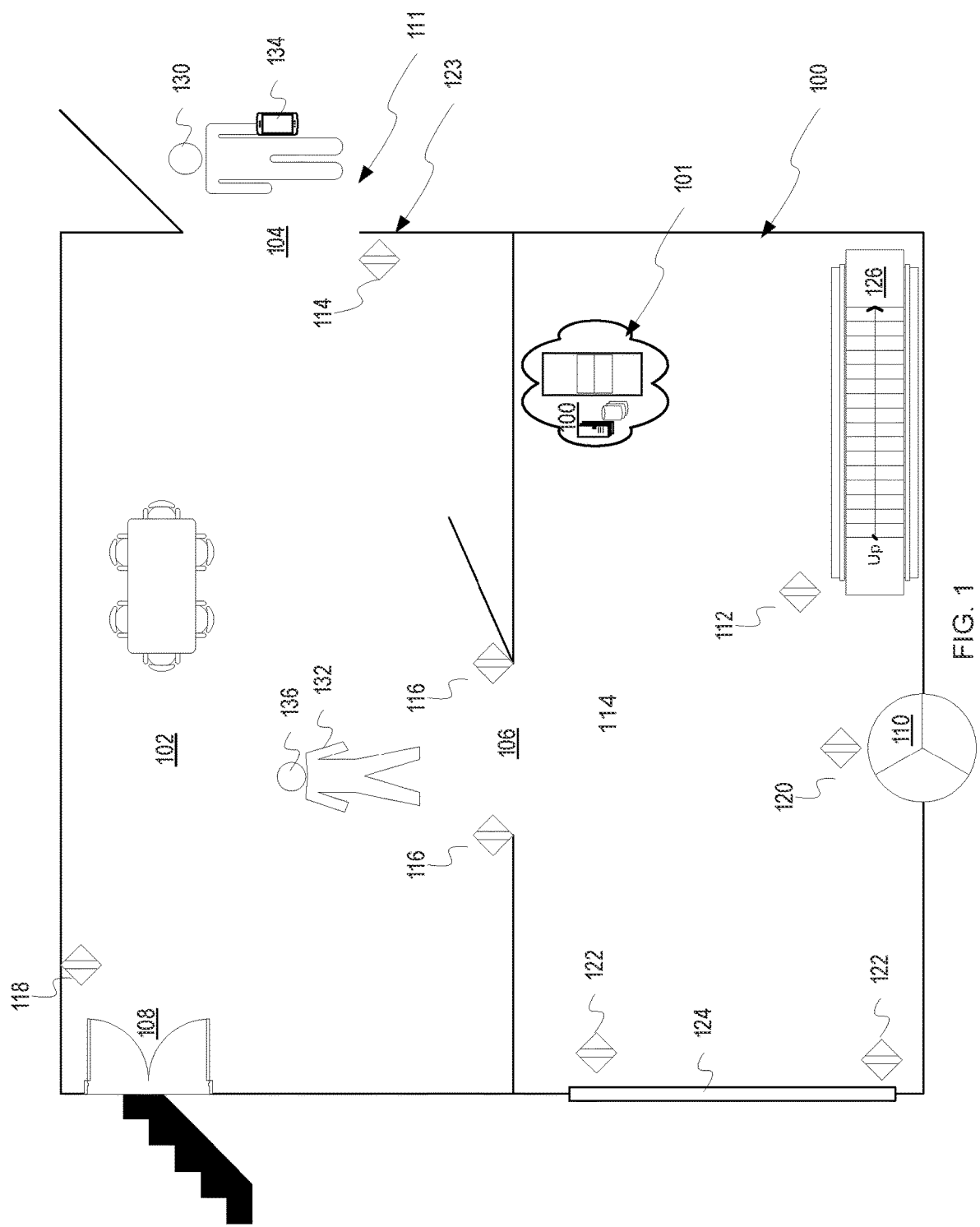
FIG. 1 is a pictorial representation of a security system in accordance with an illustrative embodiment.

The illustrative embodiments provide a system, method, and apparatus for inaudible tone generation utilized for providing security. In one embodiment, the system may be installed as a stand-alone security system, sensor, or device. The system may also be networked for integration or utilization with any number of other devices, systems, equipment, or components. The system may include transmitters, beacons, speakers, or other inaudible tone generators that communicate one or more inaudible tones. For example, the transmitters may be included in jewelry, electronics, clothing, firearms, ammunition, trays, carts, stickers, medical equipment, diagnostic equipment, receptacles, inventory, or other objects. The system may also include sensors, receivers, microphones, or other tracking components configured to receive the inaudible signals utilized.

The illustrative embodiments may be utilized to identify, match, authenticate, and track systems, devices, or equipment, users/patients/employees/individuals, medicines, and so forth. For examples, movements may be tracked through a building, facility, closet, compound, arena, or other location. The presence or absence of the inaudible tones and transmitting device may be tracked throughout the location. The inaudible signals may be utilized to determine a location, orientation, position, presence, biometrics, and so forth for both users and inanimate objects. For example, the inaudible signals may be utilized to track important or dangerous users or objects, such as prisoners, mentally unstable individuals, guns, ammunitions, medicines, bodily fluid samples, or so forth. The inaudible signals may be communicated in different combinations, sequences, patterns, or so forth to provide applicable information. The inaudible signals may include encoded data or information or may be associated with data and information that may be retrieved and accessed as needed.

The inaudible tones discussed in the illustrative embodiments may be produced from the known tone spectrum in an audio range that is undetectable to human ears. The inaudible tone range is used to carry data transmissions for inaudible data recognition, decoding, and differentiation via the inaudible tone data embedded in the inaudible tone. The inaudible tones may be combined in various inaudible tone ranges that are undetectable to human ears. The known human tone range of detection can vary from 20 Hz to 20,000 Hz. The illustrative embodiments utilize the inaudible tone spectrum in the ranges of 18 Hz to 20 Hz and 18 kHz to 20 kHz, which both fall under the category of inaudible frequencies. The illustrative embodiments may also utilize Alpha and Beta tones which use varied rates of inaudible tone frequency modulation and sequencing to ensure a broader range of the inaudible tone frequency spectrum is available from each singular inaudible tone range.

The tones carry data that is processed and decoded via inaudible receivers, sensors, or tone processors. The tone processors can be pre-installed on a single purpose listening device or installed in application format on any standard fixed or mobile device with a built-in microphone and processor. The inaudible tones broadcast data from various chips or tone transmission beacons, which are recognized and decoded at the tone processor.

The tone processors are equipped to detect and decode data contained in the inaudible signals sent from the tone chip set or beacon. The tone processor can be programmed in an always on, passive listening, scheduled listening mode or based on environmental conditions or security conditions. The data and information may also be associated with the inaudible tones so that it does not have to be encoded or decoded.

The tone processors may be portable or fixed to the location. The tone processors may be programmed to only decode tones and data specific to each system utilization. The tone processors may also be equipped to listen for the presence or absence of specific tones and recognize the presence of each specific tone throughout a location or environment. The tone processors may also be utilized to grant, limit or deny access to the system or system data based on the specific tone permissions sent from the beacon and decoded at the processor.

The embodiments, components, steps, and description of FIGS. 1-5 are meant to be combined and utilized in various combinations regardless of artificial restrictions, limitations, or separations that are placed on the various combinable embodiments.

FIG. 1 is a pictorial representation of a security system 100 in accordance with an illustrative embodiment. The security system 100 may be installed or utilized in any number of locations, facilities, buildings, arenas, compounds, locations, or areas. In one embodiment, the security system 100 may include a processing system 101. Although, not specifically shown, the processing system 101 may include any number of servers, networks, databases, communications lines, routers, repeaters, cards, interfaces, intelligent devices, hubs, antennas, or so forth. The processing system 101 may communicate with any number of sensor arrays, systems, wiring, or so forth of the security system 100.

In one embodiment, the security system 100 may represent a cloud system or network. The security system 100 may provide services to one or more facilities, entities, groups, or service providers. For example, the security system 100 may utilize available cloud systems available through Amazon Web Services, Google, Apple, IBM, Cisco, or others to record the data and information associated with the inaudible tones as described herein.

In one embodiment, a location 102 may represent a building. The location 102 may include entries 104, 106, 108, 110 (altogether entries 111) with corresponding sensors 112, 114, 116, 118, 120, 122 (altogether sensors 123). The location 102 may further include window 124 and escalator 126. Shown are users 130, 132 with transmitters 134, 136. Based on the type of location 102, tens, hundreds, thousands, tens of thousands, or hundreds of thousands of users and their associated transmitters may be tracked.

In one embodiment, the entries 111 may represent any number of entrances, doors, stairs, fire escapes, tunnels, walkways, corridors, windows, skylights, elevator shafts, or any other type of ingress or egress to the location 102. In one embodiment, the sensors 123 may be integrated with any number or types of security systems. In other embodiments, the sensors 123 may be individually installed as a stand-alone product or kit that includes the hardware interface, software, and necessary components for installation and effective utilization.

In one embodiment, the sensors 123 are measurement instruments for reading, measuring, or detecting inaudible tones or signals. In another embodiment, the sensors 123 may both transmit and receive inaudible signals. The inaudible signal received at each of the entries 111 may be uniquely and specifically detected by the sensors 123 and the security system 100 to identify a device/user. For example, an inaudible signal associated with user 103 utilizing transmitter 134 may be detected at the entry 104 by the sensor 114. The sensor 114 may send a signal uniquely associated with the sensor 114 indicating that the user 103/transmitter 134 has, is, or will passed through the entry 104.

The security system 100 may compile information from each of the sensors 123 in real-time to generate a visual representation of the various data points including, locations, movements, activity, and so forth with respect to any number of users (e.g., user's 130, 132). In one embodiment, the processing system 101 of the security system 100 may be active and processing information, and data at all times. In another embodiment, the security system 100 may only be active or activated during an emergency, based on a specified event/conditions, selectively, or as otherwise required.

In one embodiment, the sensors 123 and the transmitters 134, 136 are low power devices. As a result, they may be selectively activated based on detected motion, location, user commands, user preferences, or so forth. For example, the transmitters 134, 136 may only broadcast the inaudible signals when moving or at a preset times or intervals for location verification (e.g., every 5, 15, 30 minutes). As a result, the sensors 123 and the transmitters 134, 136 may preserve energy including battery life and power. The sensors 123 may represent any number of fixed, mobile, or temporary sensors utilized to detect inaudible signals. The sensors 123 may be capable of receiving an even broader range of inaudible signals that are broadcast from the transmitters 134, 136. As a result, any number of sets or distinct transmitters may be utilized compatibly with the security system 100 and detected by the sensors 123.

The sensors 123 and the processing system 101 may be configured to receive, process, and display a nearly infinite number of data points related to an emergency situation, event, day-to-day happenings, or so forth. The security system 100 may communicate any number of alerts audibly, visually, tactilely, electronically, or so forth to individuals within the location 102 as well as to remote locations (e.g., fire departments, security groups, response groups, etc.). In various emergency situations (e.g., massive power failure, fire, earthquake, tornado, hurricane, etc.) the security system 100, the sensors 123, the transmitters 134, 136, or other components of the security system 100, may communicate audible alarms to individuals, such as the users 130, 132. In one example, the sensors 123 may include microphones utilized to broadcast an alert, radio transmission, audio feed, or other broadcast received through a wired or wireless connection. The sensors may be connected to or integrated with the electrical systems of the location 102 (e.g., wired for power) or may be powered by power storage components, such as batteries, solar cells, ultracapacitors, fuel cells, piezo electric generators, or so forth. Thus, the sensors 123 may always be on sensing and otherwise receiving inaudible signals or tones that may carry a variety of inaudible data-based signals that may be broadcast to any number of inaudible tone sensors or readers.

In one embodiment, the sensors 123 of the security system 100 are selectively activated when notified of an emergency alert for security purposes. The security system 100 may also be activated by a user, resident, or other individual at the location 102 or triggered by indication of an alarm or other system within the location 102. The security system 100 may be perpetually activated for facilities, such as childcare facilities, patient monitoring locations, nursing homes, retirement facilities, or other locations or scenarios where tracking and monitoring may be required. In some security systems, additional passwords, biometrics, indicators, or other security measures may be required to access the data from the sensors 123 and the associated security system 100.

The security system 100 indicates whether the transmitters 134, 136 and associated users 130, 132 have entered or attempted to enter authorized or unauthorized portions of the location separated by the entries 111. In one embodiment, as an additional security feature, a network associated with the security system 100 may pre-identify and grant permission to one or more devices that may access the data and tracking information of the security system 100 as recorded by the sensors 123. The security system 100 may also indicate if information stored within the security system 100 has been accessed without authorization noting the time, location, user information, credentials, device identifiers, IP address, and other information associated with the request or retrieval.

In scenarios where the transmitters 134, 136 are out of range of the sensors 123, different sensors or systems may communicate utilizing alternative sensors connected to a centralized network of the security system 100, such as a remote computer or handheld sensor that may detect individuals or items that are tagged with a transmitter. For example, different mobile sensor systems may be utilized as part of an outdoor venue associated with the location 102.

In one embodiment, the security system 100 may include a network, servers, databases, processors, logic, or other components in the processing system 101. The network is one or more wired or wireless networks for communicating with the sensors 123 as well as other routers, repeaters, sensing components or devices, or electronic devices within the location 102.

The servers and databases of the security system 100 may store information regarding measurements made by the sensors 123 as well as the movement of the user's 130, 132 with their associated transmitters 134, 136. The security system 100 may be remotely accessed, utilizing any number of connections, signals, or so forth.

In one embodiment, an indicator, such as a sticker or posting may indicate that the sensors are available and operating. For example, first responders may utilize the indicators in order to access the sensors 123, transmitters 134, 136, or other available information managed by the security system 100. Electronic signals, messages, or indicators may also be utilized.

In one embodiment, each of the sensors 123 may act as a broadcast location that may be preprogrammed or customized with location specific data. The location specific data may represent a variety of dynamic data points that may only be activated by authorized personnel, such as managers of the location 102 or emergency service personnel. In one embodiment, the location specific data may include, but is not limited to, layout of the location 102, layout of each floor, level, or partition of the location 102, tones registered/ utilized at the location 102, inaudible signals registered to each user (e.g., user, patient, resident, pet, employee, etc.), inaudible signals presently in the location 102, historical patterns associated with the inaudible signals/users (e.g., entry and exit times, typical location, activity, authorized utilization of the location 102, etc.), relative position of each user within the location 102, user orientation and physical state (e.g., vertical, lateral, prone, seated, etc.), locations of users with disabilities and customize data relevant to that user, and data associated with each user, such as name, cell phone number, communications apps, authorized medical information, and so forth.

In one embodiment, the security system 100 may determine the position and orientation of the users 130, 132 utilizing the sensors 123. As a result, the sensors 123 may determine if the users 130, 132 are about their normal activities or if there is an emergency or health situation that needs to be addressed. In one embodiment, where allowed by privacy or security laws and agreements, all data associated with the transmitters 134, 132/users 130, 132 may be saved in a database of the security system 100. The sensors 123 may be fixed or may dynamically move about the location 102 utilizing tracks, drones (e.g., wheeled, flying, etc.). In one embodiment, the sensors 123 are located in all light switches and wall outlets to provide coverage throughout the entire location 102. For example, in scenarios where fall monitoring is essential, the unified tones may determine the location (e.g., hallway, floor, bed, couch, chair, desk, exercise equipment, dining table, bathroom, etc.) orientation of the user (e.g., standing, sitting, lying face down, lying face up), and other applicable information that may indicate the user's physical or emotional state.

In one embodiment, the security system 100 may reconfigure the system 100 including the sensors 123 or the transmitters 134, 136 in real-time. Reconfiguration may include assigning new inaudible signals to be utilized, indicating relevant information (e.g., signal strength, positioning, orientation, etc.), and any number of factors, criteria, and settings. The security system 100 may also notify a user or administrator if an inaudible signal is missing, malfunctioning, or needs to be replaced.

Different combinations of inaudible signals may also be noted by the security system 100. For example, a cart full of medical equipment may utilize a number of transmitters each with a corresponding inaudible signal. The overall tone associated with the cart may be distinct based on the equipment that may be added or removed from the cart for easily determining how the cart is loaded, such as for a surgery. In another example, the system 100 may identify transmitters corresponding to a frequency profile (e.g., eyeglasses, wedding ring, wallet, cell phone, shoes, etc.). Each of the items with the corresponding transmitters may create a unique inaudible signal frequency recognizable by the system 100. For example, the sensors 123 may be configured to detect transmissions corresponding to the location of the transmitters 134, 136, such as headbands near the user's head, a wallet or purse near the user's midsection, and shoes worn on the user's feet. The system 100 may distinguish between the different locations of the transmitters 134, 136 including whether the transmitters are worn as clothing, jewelry, or an accessory, implanted, adhered, or otherwise moved from location to location.

In one embodiment, the security system 100 may automatically sense and identify the presence of unified tones (e.g., a combination of inaudible alpha tones and inaudible beta tones). The sensors 123 may search for the presence of individual or unified signals at set intervals or locations for reporting, tracking, monitoring, and other purposes. The variations in the unified tones may be detected by the sensors 123 of the system 100. In an emergency situation or scenario, the security system 123 and the sensors 123 located at the entries 111 may determine the inaudible signals within the location 102 (e.g., alpha tones, beta tones, single tones, unified tones, etc.). The security system 100 may create a visual representation of the determined, approximated, or estimated location, functionality status, and/or activities of the transmitters 134, 136 and corresponding users 130, 132. Additional information and data may be retrieved from the inaudible signals detected by the sensors 123.

In one embodiment, the security system 100 may provide any number of benefits including added security for children, aging adults, and individuals with disabilities, home and business security, instant data and information available for emergency situations (e.g., fires, earthquakes, user falls/injuries, non-responsive individuals), and so forth. The security system 100 may not be easily hacked through stolen passwords or system breaches. In addition, the security system 100 is low power allowing for detection of inaudible signals after any number of catastrophic or daily occurrences.

Figure 2:
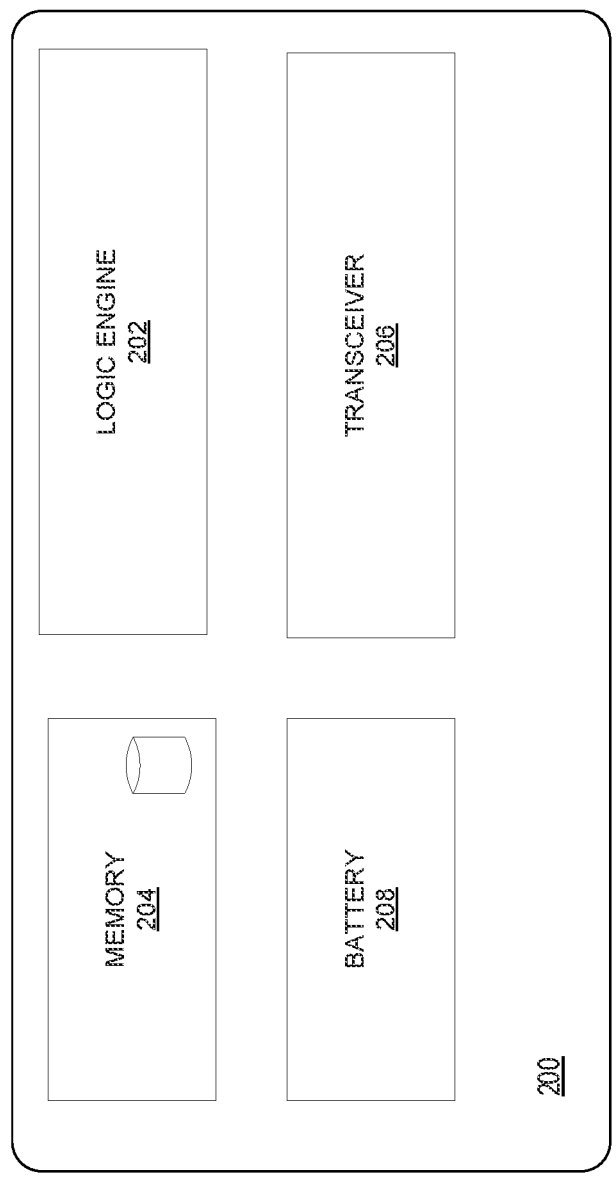
FIG. 2 is a pictorial representation of a chip of an inaudible tone transmitter in accordance with an illustrative embodiment.

FIG. 2 is a pictorial representation of a chip 200 of an inaudible tone transmitter in accordance with an illustrative embodiment. In one embodiment, the chip 200 may include a logic engine 202, a memory 204, and a transceiver 206. The chip 200 may be integrated within any number of devices or wearable components, such as a cell phone, tablet, smart watch, smart sticker, wedding ring, earrings, bracelet, glasses, identification card, keys, shoes, jewelry, pet collar, or any number of commonly worn items, components, or devices. As previously noted, the chip 200 may be communicate an inaudible signal that may be detected by one or more sensors or receivers.

The chip 200 may be assigned a unique inaudible signal. The inaudible signal is assigned to the user and associated wearable components of the user. The chip 200 may be capable of utilizing the transceiver 206 to communicate a full spectrum of inaudible signals. In one embodiment, the logic engine 202 may be utilized to assign the inaudible signal(s) broadcast and received by the transceiver 206. In addition, the chip 200 may be modified in real-time, offline, or as otherwise necessary to utilize new or distinct inaudible signals. The memory 204 may also be utilized to store and send data associated with the chip 200. The data may include information about a user, device, emergency situations, medical records, home or business work address, contact information, or so forth. The chip 200 is fully customizable and capable of communicating a multi-frequency signal range, multiple interval signal patterns, or any varied range of inaudible signals and tones (as well as other radio or optical frequencies). In one embodiment, the initial spectrum of inaudible tone patterns, not including intervals or combined patterns, may include as few as 500,000 signals. In one embodiment, specific inaudible signal ranges may be dedicated for specific purposes.

In one embodiment, the chips for specific items, users, or devices are associated with specific frequencies. The frequencies broadcast and received may identify the associated item, user, or device. For example, the chip 200 may be attached or integrated with an item of personal property, such as a piece of jewelry worn. An example is two items worn on the hand or wrist, such as a watch and a ring may be differentiated utilizing distinct inaudible signals not only as different items, but also based on the worn location. The different data may be pre-identified or associated with an end-user. For example, the user or the applicable system may indicate that the ring is always worn whereas the watch is sometimes worn. As previously noted, the chip 200 or the corresponding system may be utilized to recognize the position of the body or device The higher number of items worn by the user with the chip 200 may improve accuracy in the event of an emergency response scenario or other event. In one embodiment, the chip 200 may be utilized to track inventory. For example, a first inaudible signal may identify the item, a second inaudible signal may identify the type of item, and additional data may indicate where and how the item is stored, shipped, and used. Category based inaudible signals may be pre-assigned in the system and may represent a multitude of categories. The chip 200 may utilize static inaudible signals or dynamic signals that change based on needs or circumstances.

In one embodiment, items with the highest likelihood of being utilized or worn by a user may be marked accordingly. For example, the item maybe marked as having an "alpha tone." The alpha tones may be distinct from other inaudible signals based on their utilization and importance to the system. In one embodiment, an additional tone signal may indicate that the chip 200 associated with an item is highly utilized or almost always worn, carried, or so forth. For example, a wedding ring or medical identification bracelet with the chip 200 may be almost always worn by a user.

In another embodiment, items which are commonly worn or carried by the owner may be distinguished utilizing a secondary tone marked as being a "beta tone". For example, commonly worn or carried items may include wallets, licenses, credit cards, keys, shoes, devices or so forth.

The chip 200 may also be integrated in headwear (e.g., hats, caps, beanies, etc.), face wear (e.g., glasses), ear wear (e.g., earrings), neck wear (e.g., necklaces, scarves, etc.), waist wear (e.g., belts, sashes, buckles, etc.), finger wear, carried items (e.g., purses, backpacks, jackets, etc.), or user assigned inventory. In one embodiment, the chip 200 may be integrated in a tray, cart, sticker, magnetic unit, label, or adhesive that may be attached or worn.

In one example, a signal range may be dedicated for individuals with disabilities or that have special needs. When applicable, the inaudible signal from the reserved range of signals may be added to the sensor signal data recorded by the logic engine 202 in the memory 204 to be utilized by the transceiver 206. The signal range may include any number of pre-appointed data points that may be customized to provide information regarding the user including home address, work address, contact information, mental illnesses if applicable, known health conditions, guardians, and so forth. The inaudible signals utilized by the chip 200 may be infinitely customizable to include data points relating to the care, protection, and observation of individuals with disabilities or special needs. In one embodiment, an inaudible tone may be assigned to the chip 200 based on a selected service, such as an emergency tracking service, monitoring service, business process, or so forth. The chip 200 may be utilized by any number of employees, residents, children, pets, or individuals.

The logic engine 202 is the logic that controls the operation and functionality of the chip 200. The logic engine 202 may include circuitry, chips, and other digital logic. The logic engine 202 or the memory 204 may also include programs, scripts, and instructions that may be implemented to operate the logic engine 202. The logic engine 202 may represent hardware, software, firmware, or any combination thereof. In one embodiment, the logic engine 202 may include one or more processors. The logic engine 202 may also represent an application specific integrated circuit (ASIC) or field programmable gate array (FPGA). In one embodiment, the logic engine 202 may execute instructions to manage the chip including interactions with the components of the chip 200.

The logic engine 202 may control how and when the chip 200 broadcasts and receives inaudible tones. The logic engine 202 may utilize any number of factors, settings, or user preferences to communicate utilizing the inaudible tones. For example, the user preferences may specify an inaudible tone, transmission strength (e.g., amplitude), transmission frequency, and so forth.

The memory 204 is a hardware element, device, or recording media configured to store data or instructions for subsequent retrieval or access at a later time. For example, the memory 204 may store data that is broadcast as part of the inaudible signals. The memory 204 may represent static or dynamic memory. The memory 204 may include a hard disk, random access memory, cache, removable media drive, mass storage, or configuration suitable as storage for data, instructions, and information. In one embodiment, the memory 204 and the logic engine 202 may be integrated. The memory may use any type of volatile or non-volatile storage techniques and mediums. The memory 204 may store information related to the status of a user, chip 200 or an integrated device, such as communications device, computing device, or other peripherals, such as a cell phone, smart glasses, a smart watch, a smart case for the chip 200, a wearable device, and so forth. In one embodiment, the memory 204 may display instructions, programs, drivers, or an operating system for controlling a user interface (not shown) including one or more LEDs or other light emitting components, speakers, tactile generators (e.g., vibrator), and so forth. The memory 204 may also store thresholds, conditions, signal or processing activity, proximity data, and so forth.

The transceiver 206 is a component comprising both a transmitter and receiver which may be combined and share common circuitry on a single housing. In one embodiment, the transceiver 206 may communicate inaudible signals utilized as herein described. In other embodiments, the transceiver 206 may also communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 206 may also be a hybrid or multi-mode transceiver that supports a number of different communications. For example, the transceiver 206 may communicate with a sensor utilizing inaudible signals and with a wireless device utilized by a user utilizing NFC, or Bluetooth communications. The transceiver 206 may also detect amplitudes and signal strength to infer distance between the chip 200 and other devices/components. The transceiver 206 may also refer to a separate transmitter and receiver utilized by the chip 200.

The components of the chip 200 may be electrically connected utilizing any number of wires, contact points, leads, busses, wireless interfaces, or so forth. In addition, the chip 200 may include any number of computing and communications components, devices or elements which may include busses, motherboards, printed circuit boards, circuits, chips, sensors, ports, interfaces, cards, converters, adapters, connections, transceivers, displays, antennas, and other similar components. Although not shown, the chip 200 may include a physical interface for connecting and communicating with other electrical components, devices, or systems. The physical interface may include any number of pins, arms, or connectors for electrically interfacing with the contacts or other interface components of external devices or other charging or synchronization devices. For example, the physical interface may be a micro USB port. In one embodiment, the physical interface is a magnetic interface that automatically couples to contacts or an interface. In another embodiment, the physical interface may include a wireless inductor for charging a battery 208 of the chip 200 without a physical connection to a charging device. The physical interface may allow the chip 200 to be utilized as a remote microphone and sensor system (e.g., seismometer, thermometer, light detection unit, motion detector, audio recorder, etc.) when not being utilized as a transmitter. For example, measurements, such as noise levels, temperature, movement, and so forth may be detected by the chip 200 even when not worn. In another example, the chip 200 may be utilized as a temporary security system recording motion and audio detected in an associated location.

In one embodiment, the chip 200 may include a battery 208. The battery 208 is a power storage device configured to power the chip 200. In other embodiments, the battery 208 may represent a fuel cell, thermal electric generator, piezo electric charger, solar cell, ultra-capacitor, or other existing or developing power storage or generation technologies. The logic engine 202 preserves the capacity of the battery 208 by reducing unnecessary utilization of the chip in a full-power mode when there is little or no benefit to the user (e.g., there is no reason to transmit, the information has already been received, the chip 200 is out-of-range of a receiving device, etc.). In one embodiment, the battery 208 or power of the chip 200 is preserved to broadcast the inaudible signals when entering or leaving a room.

Although not shown, the chip 200 may include any number of sensors (e.g., orientation, acceleration, motion, etc.), navigation devices (e.g., global positioning systems, wireless triangulation, etc.), or other sensors. For example, the chip 200 may activate all or portions of the components in response to determining the chip 200 is being moved or based on the location.

The receivers, sensors, or tone transmitters may include all or portions of the components of the chip 200 (the description is equally applicable). In one embodiment, the tone transmitters may utilize a specialized application or logic to identify the inaudible tones utilizing an on-board memory or access to remote devices, database, or memories. The network connection may also be utilized to communicate updates for tracking the inaudible tones/transmitters throughout the location, updating applicable information, sending indicators, alerts, or messages, or performing other communications. For example, the receiver may include a hybrid transceiver for both wireless and wired communications with a processing system, cloud network, cloud system or so forth.

Figure 3:
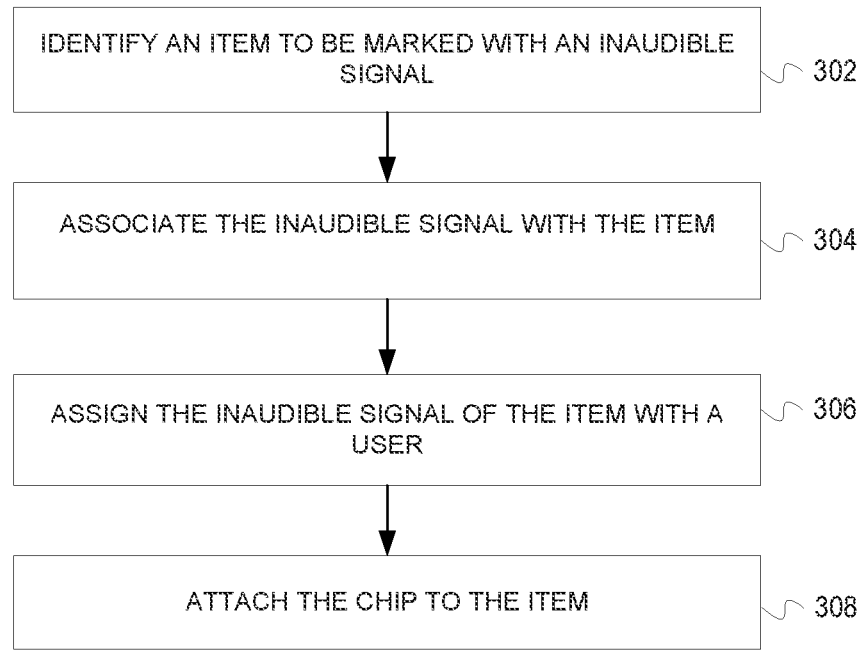
FIG. 3 is a flowchart of a process for assigning an inaudible signal in accordance with an illustrative embodiment.

FIG. 3 is a flowchart of a process for assigning an inaudible signal in accordance with an illustrative embodiment. In one embodiment, the process of FIG. 3 may be implemented by a security system (e.g., security system 100 of FIG. 1), such as those shown and described herein, in conjunction with a chip, tag, or marker as are also described herein (e.g., chip 200 of FIG. 2).

In one embodiment, the process may begin by identifying an item to be marked with an inaudible signal (step 302). In one embodiment, the item may be marked utilizing a wireless device, such as a cellular phone, and a specialized application executed by the cellular phone. For example, the item to be marked may be a watch. In one embodiment, the item may include a description or identifiers that are unique to the item or the user associated with the item. In another embodiment, the process may begin by selecting the inaudible signal to be associated with the item. The inaudible signal may be selected automatically utilizing available frequencies or a user may access the system to select a desired inaudible signal. In one embodiment, the user may be requested to identify information associated with the item, such as item category, item type, item value, item description, handling instructions, shipping information, or so forth. As noted, the inaudible signal may be utilized to identify a number of users or inanimate objects. In another embodiment, the item may be marked by attaching the transmitter, marker, tag, or other identifier generating the inaudible signal.

Next, the system associates the inaudible signal with the item (step 304). In one embodiment, the item identifier may be associated with the specific inaudible signal emitted by the chip, tag, or marker. For example, the system may save the identifier and the inaudible signal in a database accessible to any number of devices, users, or so forth. In another example, a sensor may associate the inaudible signal with the item based on information provided by a user or automated process.

Next, the system assigns the inaudible signal of the item with a user (step 306). The user may represent an individual, business, family, organization, entity, organization, group, or so forth. In one embodiment, the user may represent a person responsible for the item, a manager, administrator, or so forth. The user may also be an individual wearing the transmitter. In other embodiments, the inaudible signal may not be required to be associated with a user.

Next, the system attaches the chip to the item (step 308). In one embodiment, the chip may be automatically attached to the item as part of a manufacturing or other process. In other embodiments, the chip may be attached by a user utilizing a dedicated device, such as crimps, pliers, or other specialized or customized instruments. In other embodiments, the chip may include a mechanical, electrical, or chemical fastening component, such as a clip, snap, wire tie, adhesive backing or so forth. The chip may also be attached utilizing glue, adhesives, welding, plastic bonding, or any number of other related processes. After the process of FIG. 3 is completed, the item may be considered tagged. In one embodiment, the chip or item may be marked as an alpha tone.

In one embodiment, the chip may be utilized to detect the presence or location of items or users and locations with inaudible signal sensors. The utilization of different inaudible signals may help distinguish and identify a number of different items from one another. During the process of FIG. 3, the items and associated inaudible tones may be marked as being "alpha tones", "beta tones", or utilizing other identifiers. Utilization information, such as carrying height, position, covered/uncovered, may also be recorded by the system or subsequently determined for best reading the inaudible signals during movement from one location to another.

In one embodiment, the inaudible tones may be generated in response to one or more conditions or factors, such as the chip, tone beacon, marker, or tag being moved, utilized, activated (or the associated device), movement through an entrance point, The utilization of alpha tones as well as beta tones may provide additional indications regarding the presence or lack thereof of various users/items. In one embodiment, a combination of distinct inaudible signals may create a unique pattern that provides valuable information (e.g., user/owner of the items, category and type of the items, movement history, etc.). In one example, when each chip with an alpha tone is worn in its appropriate location on the user, a unique unified alpha tone frequency may be created for detection. In one embodiment, the combined alpha frequency state is achieved one each at alpha tone tagged item is worn in an appropriate location and generating a unique inaudible signal frequency. The combined tones from any number of alpha and beta signals may represent a unified frequency that may be utilized to identify users, devices, vehicles, systems, equipment, or so forth. As a result, individual users may be more precisely tracked and located (e.g., for emergency situations).

In one embodiment, the detected position, signal strength, location, orientation, and other information detected by a sensor communicating with the inaudible signal chip may indicate information about the user, such as walking, laying, sitting, watching television, exercising, or so forth. Determining user information may be critical for determining if a user is incapacitated or otherwise needs help (e.g., has fallen, in a diabetic coma, etc.).

Figure 4:
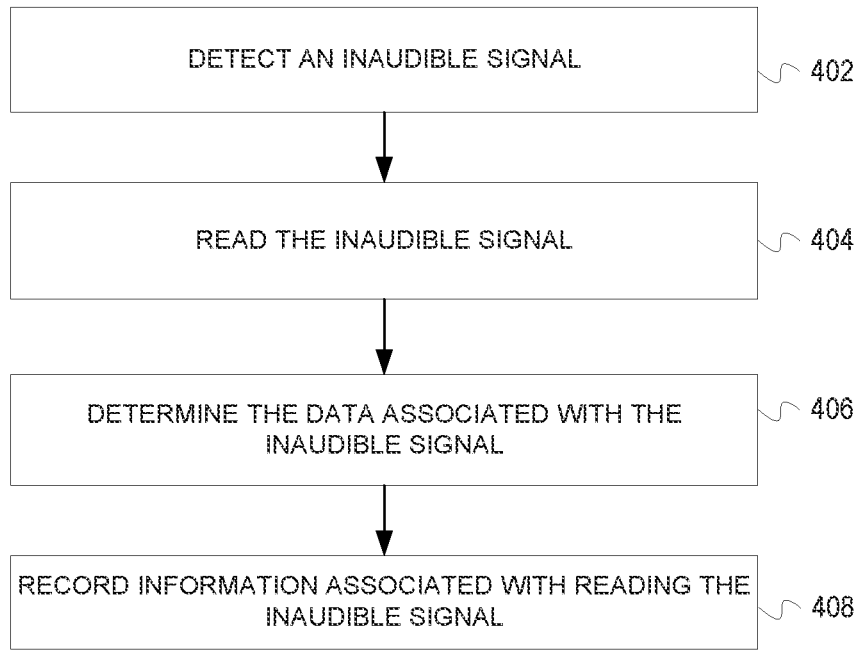
FIG. 4 is a flowchart of a process for processing inaudible signals in accordance with an illustrative embodiment.

FIG. 4 is a flowchart of a process for processing inaudible signals in accordance with an illustrative embodiment. The process of FIG. 4 may be performed by one or more sensors configured to detect inaudible signals. In one embodiment, the process may begin by detecting an inaudible signal (step 402). In one embodiment, the sensor(s) or receiver(s) may constantly be looking for inaudible signals. In other embodiments, the sensors may search for inaudible signals in response to an event, condition, or threshold being met.

Next, the sensor read the inaudible signal (step 404). The inaudible signal may represent one or more inaudible signals. For example, the inaudible signal may represent multiple inaudible signals received as a combined signal. Different types of inaudible signals may be associated with different categories of information, such as users, medicines/compounds/mixtures, devices (e.g., medical diagnosis equipment, treatment carts, etc.), and so forth.

Next, the sensor determines data associated with the inaudible signal (step 406). In one embodiment, the inaudible signal may be associated with data or may include data and information that is embedded in the inaudible signal. For example, the data may be decoded or otherwise extracted from the inaudible signal. Any number of secure processes may be utilized to secure the data included in the inaudible signal (e.g., encryption, etc.) In another embodiment, the data may have been previously registered or associated with the inaudible signal. For example, the inaudible signal is read and identified in step 404 to retrieve the associated data form a memory or through a device in communication with the sensors. In one embodiment, the sensors may implement a specified action or process associated with the data. For example, a message, alert, or indicator may be automatically sent in response to detect the inaudible signal at one or more designated locations. In another embodiment, systems, such as billing, HVAC, air filtration, lighting, real-time management, and so forth may be activated based on the inaudible signal.

Next, the sensor records information associated with reading the inaudible signal (step 408). The sensor may record information, such as time of reading, location, movement history, received signals (e.g., one or more), identified user/device, authorizations, and so forth. The sensor records may be saved to one or more devices, memories, or databases. The sensor records may be saved for subsequent reference for tracking user/device movements, performing billing, ensuring safety, and otherwise processing information.

In one illustrative embodiment, the system may be utilized in a hospital for patient monitoring. For example, at the time of admission a patient may be assigned a medical identification bracelet, a medical necklace, nonslip medical or surgical shoes, or any other items of hospital property that may be assigned to the patient. Each item of inventory is equipped with an inaudible signal transmitter. At the time of admission into the hospital, the patient data may be gathered, and the patient may be assigned the medical bracelet. The bracelet may then be associated with the patient utilizing a unique inaudible signal that may associate the medical bracelet, the patient, a location assigned to the patient, and the patient's medical records. As a result, the patient may be identified and tracked throughout the hospital to better care for the patient. The same process may be performed across any number of hospital assigned items including, but not limited to, wheelchairs medical monitoring equipment, medications, or any number of durable medical goods. As previously noted, the medical bracelet as well as any number of other transmitters may generate a unified tone for recognizing, identifying, and distinguishing any number of items as well as the patient.

In another illustrative embodiment, the system may be utilized for gun registrations where a gun type, model, brand, serial number, caliber, and other applicable data related to the gun is stored in a small chip broadcasting and inaudible signal that may be attached to or integrated with the gun (e.g., at the time of manufacture, at the time of sale, etc.). The chip and associated inaudible signal may also be assigned and coupled to the gun during the licensing or renewal of a gun permit, user license, or so forth. When the gun is purchased and licensed, an additional inaudible signal may be assigned to the gun utilizing the integrated chip. The chip may now contain data relating to the gun itself as well as the owner/operator of the gun. Due to the variance in gun laws at a state and federal level, the inaudible signals may include any number of data points or information related to the gun, gun ownership, gun restrictions, gun maintenance and care, authorized use, and so forth. In one embodiment, law enforcement personnel may have access to the inaudible signals through an electronic device, such as a cell phone or inaudible signal reader. Access to the inaudible signals emitted from the gun may be limited to utilization during emergency scenarios or lawful requests made through a warrant.

In one embodiment, the chip and associated inaudible signal may be utilized to identify and confirm that an applicant has undergone a background check and safety training. For example, the gun operator may be required to have passed a written and performance-based test showing and demonstrating knowledge of safely loading, firing, storing, carrying, and otherwise accessing the gun. In other embodiments, the chip may be utilized to track information such as movement of the weapon, loading or unloading of the weapon, cleaning, firing, or so forth. In other embodiments, a user may be required to carry a card with an inaudible signal that indicates that the user is authorized to carry and fire the firearm. The chip may be utilized with any number of weapon systems, subsystems, components, or so forth.

In another embodiment, the illustrative embodiments may be utilized for determining the location and presence of ammunition. Boxes, cases, or groups of ammunition or individual cartridges may include a chip/tag. Various state or federal laws may require that ammunition include a method, system, and inaudible tone emitters for tracking ammunition. In one embodiment, fixed sensor based systems, such as entries and exits of warehouses, military bases, or mobile tracking systems, such as vehicles, airplanes, drones, or so forth may be utilized to track movement and utilization of the marked ammunition. In other embodiments, utilization of inaudible tones for ammunition may only be activated and utilized where lawfully permitted (e.g., sending and receiving data based on a search warrant).

In another embodiment, the system may be utilized to track and locate items or users during a natural disaster or in anticipation of a catastrophic event. For example, prior to any natural disaster, precautionary measures may be implemented through planning and disaster readiness. As part of disaster readiness preparations, each person in a disaster area may be assigned one or more chips or tags associated with inaudible signals. For disaster preparation scenarios, the tags may be worn or integrated with multiple items that are difficult to remove, such as rings, medical bracelets, necklaces, earrings, or so forth. Each individual that elects to participate may be assigned a unique inaudible signal assigned to the item and the user. In one embodiment, sensors configured to detect the inaudible signals may be placed at entry points, passageways outside buildings or in any number of locations throughout a disaster area. The sensors may be utilized to create an it inaudible signal network by systematically placing the sensors in various locations, such as light posts, walls, signs, or other structures that may be less susceptible to whether or natural disasters. In the aftermath of a natural disaster, individuals that are missing, incapacitated, or trapped may be located utilizing the inaudible signal begins or transmitters. In some embodiments, the sensors may be moved from location to another in order to sense the inaudible signals, such as rolling sensor systems attached to vehicles, aerial drones, or so forth. In one embodiment, the transmitters may be configured to temporarily broadcast an inaudible signal at a much higher amplitude to be received at a greater distance or range. As a result, users may be able to receive help or assistance that is needed.

In another embodiment, inaudible signals may be captured by a user it who is watching television or other media content. For example, advertisers and broadcasters may deliver inaudible smart tones or signals within their content during the broadcast. The user may engage in a dialogue or communication based on the advertising, marketing, or content information and data. For example, the inaudible signals communicated as part of a broadcast may be received by a smart phone of the user. Thus, the user may be able to communicate with an advertiser or other party in order to achieve a desired call to action (e.g., purchase, information download, etc.).

In another embodiment, the system may be utilized to perform proximity advertising. For example, an audio advertisement for hot chocolate at a national donut shop may be broadcast over the radio. The audio radio advertisement may also include an inaudible signal that may be processed by a device of the user. The inaudible communication may include a coupon or other communication that may be saved or displayed to the user in real-time. For example, the next time the potential customer is within 1 mile of a specified location, a coupon may be displayed to the user based on the advertisement. The illustrative embodiments may include any number of opt in/opt out settings and policies that ensure that the system complies with applicable laws, industry standards, and best practices.

In another embodiment, the system may be utilized for social sharing. For example, an application being utilized by an end-user may enable the ability to instantly share a song, website location, channel, picture, file, stream, download, or other content across any number of social network platforms utilizing the inaudible signal.

The illustrative embodiments may also be utilized to tag farm livestock with chips that identify the animal, the owner, assigned location, medical history, handling instructions, shipping instructions, and so forth. Any number of sensors may be integrated within the corrals, walls, fences, pans, and cages utilized by the system. Likewise, a veterinary office or pet store may utilize chips in a caller for tracking an animal's identity, medical warnings, handling instructions, or so forth. The data stored within the chip may be customized or updated after each visit, inoculation, treatment, or so forth.

In another embodiment, a prisoner or individual within a correction facility may be assigned a chip or tag. The chip or tag may be integrated or attached to close, shoes, or any number of personal property items allowed in the correctional facility, jail, prison, or associated location. The inaudible signals may be used to passively identify and monitor the position, orientation, and activity of the prisoner, volunteer, administrator, or guard.

In another embodiment, the chip may be integrated with an item, such as a diaper. The chip may be configured to detect moisture setting off a trigger to generate the inaudible signal. For example, a moisture threshold may trigger the chip within the diaper to broadcast a signal. The inaudible signal may indicate without embarrassment which resident or infant may need attention (e.g. bathroom break, diaper change, etc.). The system may also be used by staff, nursing aides, or parents who wish to be automatically alerted when a diaper change is needed.

The illustrative embodiments may also be utilized as an antitheft system. For example, the system may be utilized to perform inventory tracking at retail, manufacturing, service, or industrial locations. The system may give owners the ability to track the movement of inventory including product losses by minute, hour, week, year, or so forth. For example, a product set or department that may be stolen with regularity may include a chip in the price tag or so forth that may broadcast the inaudible signal. Sensors or readers may be placed in each aisle, exit, or other location for detecting the movement of the associated items. In one embodiment, the security system may correlate purchases of specific items with movements to determine whether items have been lawfully purchased as moved from the facility. The sensors may also be equipped with an alarm functionality that may sound or trigger a silent alarm. As a result, an individual or business may be able to better track store inventory to decrease losses due to theft, shoplifting, accidents, or so forth.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 5:
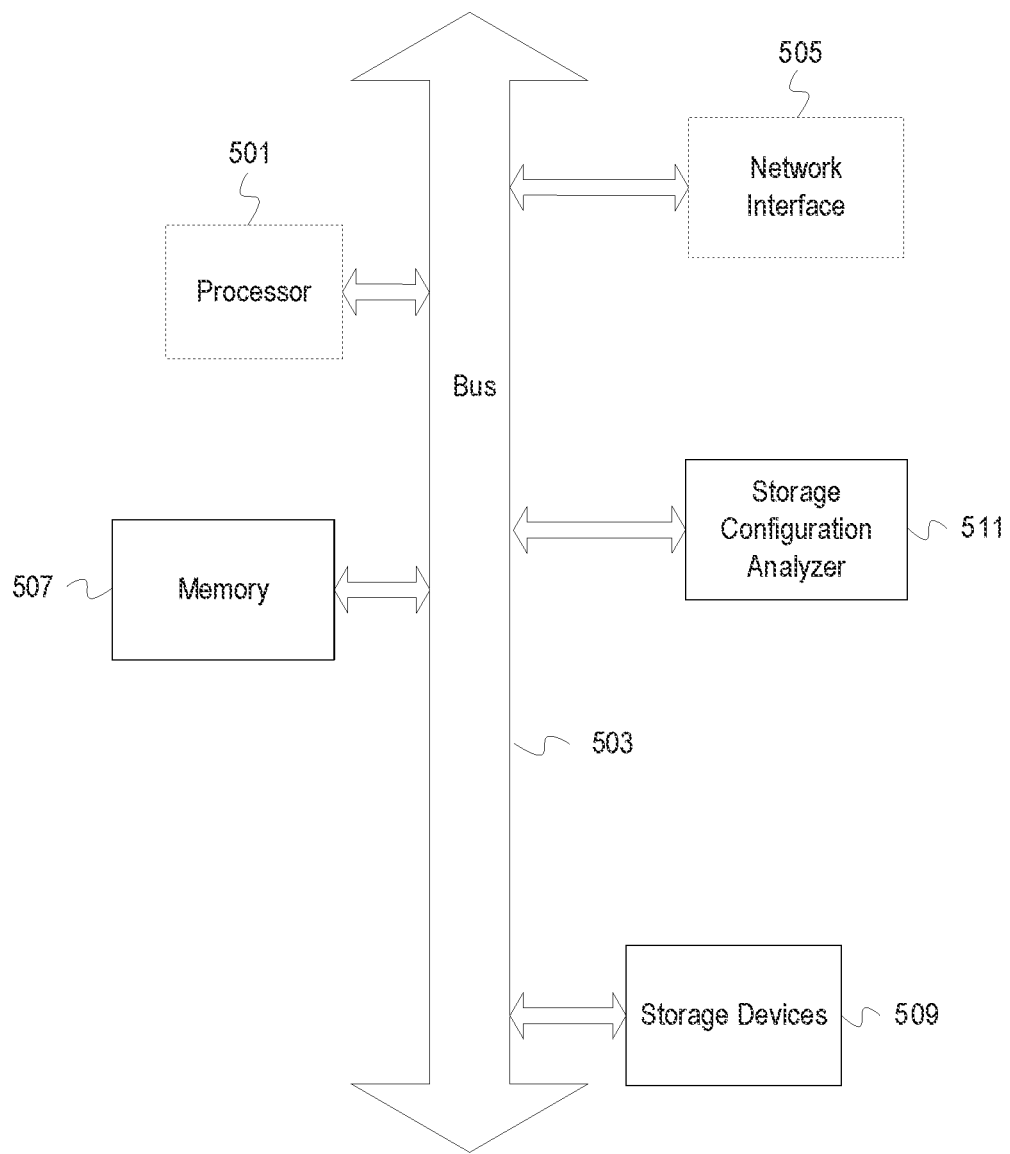
FIG. 5 depicts a computing system in accordance with an illustrative embodiment.

FIG. 5 depicts a computing system 500 in accordance with an illustrative embodiment. For example, the computing system 500 may represent a system or device, such as the processing system 101 of FIG. 1. The computing system 500 includes a processor unit 501 (possibly including multiple processors, multiple cores, multiple nodes, and/or implementing multi-threading, etc.). The computing system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 503 (e.g., PCI, ISA, PCI-Express, HyperTransport®, InfiniBand®, NuBus, etc.), a network interface 506 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement all or portions of the embodiments described above. The system memory 507 may include one or more applications or sets of instructions for implementing tracking, monitoring, associating, or generation of inaudible signals. In one embodiment, an inaudible signal engine may be utilized to communicate with one or more transmitters or sensors. The inaudible signal engine may be stored in the system memory 507 and executed by the processor unit 502. Code may be implemented in any of the other devices of the computing system 500. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501. The computing system 500 may further include any number of optical sensors, accelerometers, magnetometers, microphones, gyroscopes, temperature sensors, and so forth for verifying user biometrics, or environmental conditions, such as motion, light, or other events that may be associated with the transmitters (e.g., chip, tag, etc.), sensors, user, or their environment.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A tracking system, comprising:
a plurality of sensors receiving one or more inaudible tones from an electronic device detected by at least one of the plurality of sensors, wherein the one or more inaudible tones are inaudible to humans, and wherein the one or more inaudible tones includes embedded information regarding a user or an object associated with the electronic device;
a server in communication with the plurality of sensors identifies a location of the electronic device in response to detecting the one or more inaudible tones associated with the electronic device.

2. The tracking system of claim 1, wherein the electronic device includes a transmitter transmitting the one or more inaudible tones that are inaudible to humans.

3. The tracking system of claim 1, wherein the electronic device transmits the one or more inaudible tones in response to the electronic device being moved or a request received by the electronic device.

4. The tracking system of claim 1, wherein the electronic device is configured to transmit the one or more inaudible tones perpetually, at preset times, at time intervals, and in response to the electronic device being utilized.

5. The tracking system of claim 1, wherein the plurality of sensors identify the location and orientation of the electronic device.

6. The tracking system of claim 1, wherein the server communicates an alert in response to detecting the electronic device in an unauthorized location.

7. The tracking system of claim 1, further comprising:
storing locations of a plurality of electronic devices detected by the plurality of sensors, wherein the plurality of electronic devices including the electronic device each communicate a unique inaudible tone.

8. The tracking system of claim 1, wherein the plurality of sensors detect a plurality of distinct inaudible tones associated with a plurality of electronic devices.

9. The tracking system of claim 1, wherein the server stores information associated with the one or more inaudible tones.

10. The tracking system of claim 1, wherein the one or more inaudible tones indicate a status of a user or item associated with the electronic device.

11. A tracking system, comprising:
a plurality of sensors configured to receive one or more inaudible tones from a plurality of electronic devices including an electronic device, wherein the one or more inaudible tones are inaudible to humans, wherein the one or more inaudible tones includes embedded information regarding a user or an object associated with the electronic device;
a server in communication with the plurality of sensors identifies a location of an electronic device in response to detecting the one or more inaudible tones associated with the electronic device.

12. The tracking system of claim 11, wherein each of the electronic device includes a transmitter transmitting the one or more inaudible tones that are inaudible to humans.

13. The tracking system of claim 11, wherein the plurality of electronic devices are configured to transmit the one or more inaudible tones in response to being moved, a request received, perpetually, at preset times, at time intervals, and utilization.

14. The tracking system of claim 11, wherein the server communicates an alert in response to detecting one of the plurality of electronic devices in an unauthorized location.

15. The tracking system of claim 11, wherein the server tracks locations of the plurality of electronic devices detected by the plurality of sensors.

16. A tracking system, comprising:
A plurality of electronic devices each of the plurality of electronic devices transmit one or more inaudible tones wherein the one or more inaudible tones are inaudible to humans, and wherein the one or more inaudible tones includes embedded information regarding a user or an object associated with the electronic device;
a plurality of sensors configured to receive one or more inaudible tones from a plurality of electronic devices including an electronic device;
a server in communication with the plurality of sensors identifies a location of an electronic device in response to detecting the one or more inaudible tones associated with the electronic device.

17. The tracking system of claim 16, wherein each of the plurality of electronic devices transmits one or more inaudible tones inaudible to humans unique to the plurality of electronic devices.

18. The tracking system of claim 16, wherein the plurality of electronic devices are configured to transmit the one or more inaudible tones perpetually, at preset times, at time intervals, and in response to the electronic device being utilized.

19. The tracking system of claim 16, wherein the one or more inaudible tones indicate a status of a user or item associated with the plurality of electronic devices.

20. The tracking system of claim 16, wherein the plurality of sensors identify the location and orientation of the electronic device.

* * * * *